United States Patent
Sato

[11] 3,760,713
[45] Sept. 25, 1973

[54] TOASTER WITH A CLOSURE COVER

[75] Inventor: Hosei Sato, Nishinomiya, Japan

[73] Assignee: Matsushita Electric Industrial Co., Ltd.; Toyo Press Co., Ltd., both of Osaka, Japan

[22] Filed: June 9, 1972

[21] Appl. No.: 261,400

[52] U.S. Cl. ................... 99/391, 99/339, 99/393
[51] Int. Cl. ............................................ A47j 37/08
[58] Field of Search ................. 99/339, 359, 385, 99/391, 393, 394, 399

[56] References Cited
UNITED STATES PATENTS

| | | | |
|---|---|---|---|
| 2,605,832 | 8/1952 | Mueller | 99/393 X |
| 2,659,295 | 11/1953 | Soccoli | 99/339 |
| 2,880,665 | 4/1959 | Katz | 99/339 |
| 3,170,416 | 2/1965 | Gerlich | 99/339 UX |
| 3,347,153 | 10/1967 | Sutton | 99/391 X |
| 3,416,430 | 12/1968 | Hauser | 99/391 X |

Primary Examiner—John Petrakes
Assistant Examiner—Arthur O. Henderson
Attorney—Richard K. Stevens et al.

[57] ABSTRACT

A toaster provided with a closure cover slidably mounted on the upper surface of said toaster and adapted to close a bread inlet opening of the toaster, and with a closure cover operating mechanism including an arm having a horizontally extending lower portion pivotably supported by an inner casing of the toaster and an upright portion extending upwardly from said horizontally extending lower portion and operatively connected at its upper end to the closure cover. The closure cover operating mechanism is operatively associated with a bread carrier frame elevator mechanism of the toaster in such a manner that said closure cover may be shifted to a position to close the bread inlet opening when the bread carrier frame is lowered and to a position to open said bread inlet opening when said bread carrier frame is elevated.

9 Claims, 8 Drawing Figures

TOASTER WITH A CLOSURE COVER

This invention relates to improvements in the bread toaster of the type provided with a bread inlet opening closure cover and is intended to achieve the toasting of a slice of bread efficiently with a high quality of toasting by closing the bread inlet opening with a slidable closure cover.

In the conventional toasters of the type described, a closure cover has been supported along the bread inlet opening by means of either hinges or levers. Therefore, these conventional toasters have had the problems that the opening or closing operation of the closure cover is generally accompanied by large sounds where said closure cover is operatively associated with a bread carrier frame elevating mechanism, and that the closure cover not only is insufficiently durable mechanically but also spoils the appearance of the toaster.

The primary object of the present invention, therefore, is to provide a toaster with a closure cover, in which the closure cover can be operated by a simple mechanism with less sound, and which is durable and has an excellent appearance.

Another object of the invention is to provide a toaster of the character described above, in which the closure cover is of a sliding type and hence operates smoothly.

Still another object of the invention is to provide a toaster of the character described, in which means is provided to alleviate an external force applied to a closure cover operating mechanism, so as to ensure infallible oeration of the closure cover.

Still another object of the invention is to provide a toaster of the character described, in which the arrangement is made such that the closure cover may be mounted and demounted in a simple manner, so as to avoid the phenomenon in which the closure cover cannot be opened under external force.

Still another object of the invention is to provide a toaster of the character described, in which the closure cover and the closure cover operating mechanism are operatively connected with each other through a spring having one end anchored to the upper end of an arm of said operating mechanism and the other end anchored to a slide plate carrying said closure cover, so as to prevent an external force applied to said closure cover from transmitting to the operating mechanism and thereby ensuring satisfactory opening and closing operation of the closure cover.

A further object of the invention is to provide a toaster of the character described, in which a mechanism is provided for opening and closing the closure cover independently of the operation of a bread carrier frame elevating mechanism, so that said closure cover may be manually opened and closed as desired.

According to the present invention there is provided a toaster with a closure cover, comprising an inner casing defining a bread toasting chamber, a bread carrier frame provided in said toasting chamber and being vertically movable therein, an elevator mechanism for vertically moving said carrier frame, an outer casing provided with bread inlet openings in communication with said toasting chamber, a closure cover slidably mounted on said outer casing and adapted to close said bread inlet openings, and a closure cover operating mechanism including an arm having a horizontal lower end portion pivotably supported by said inner casing and an upright portion extending upwardly from said horizontal lower end portion and operatively connected at its upper end to said closure cover, said elevator mechanism being provided with two engaging elements for engagement with said arm to actuate said operating mechanism in such a manner as to shift said closure cover to a position to close the bread inlet opening when the bread carrier frame is lowered and to a position to open said bread inlet opening when said bread carrier frame is elevated.

The present invention will be described in further detail hereunder with reference to the accompanying drawings.

Figure 1:
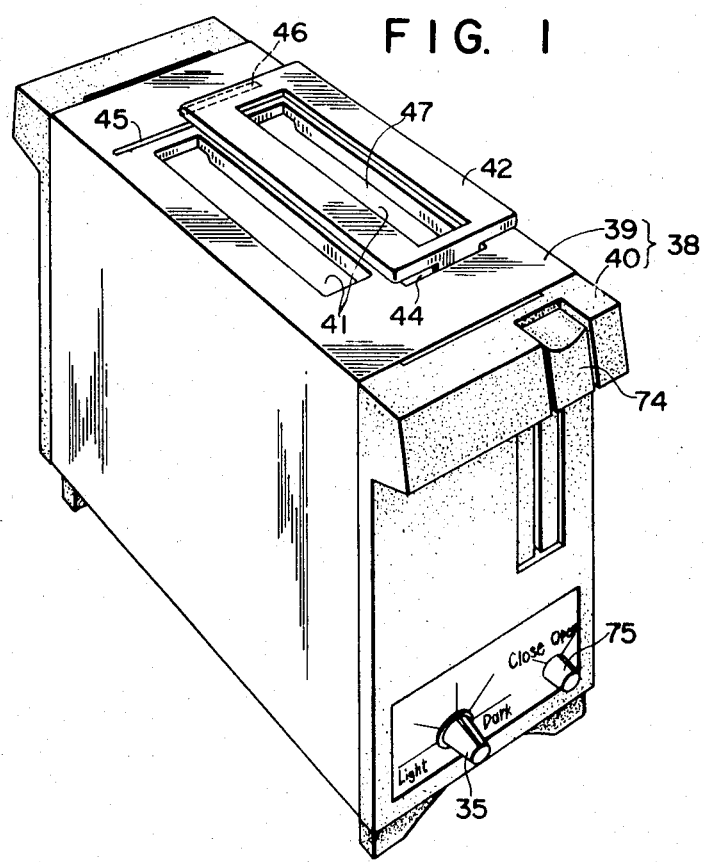
FIG. 1 is a perspective view of an embodiment of the toaster with a closure cover according to the present invention.
Figure 3:
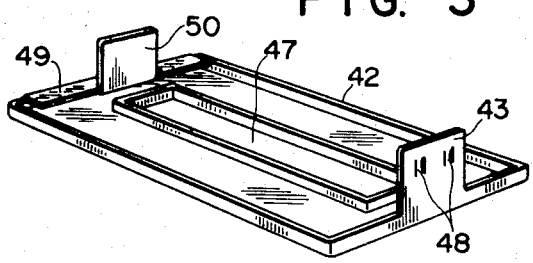
FIG. 3 is a perspective view of the closure cover of the toaster shown in FIG. 2 as viewed from the back side thereof.

An inner casing 1 is composed of side plates 3 extending upright from a base 2 and a plurality of heaters 4 connected between said side plates 3 defining toasting chambers 5. In the toasting chamber 5 is provided bimetal means (not shown). Also provided in the toasting chamber 5 is a vertically movable bread carrier frame 6 which is supported by an elevator mechanism 7. The elevator mechanism 7 comprises a guide post 8 supported by the inner casing 1, an elevator plate 9 connected to the carrier frame 6 and being vertically slidably movable along the guide post 8, a spring 10 constantly biasing said elevator plate 9 upwardly, and an elevator lever 11 depressing the elevator plate 9 against the biasing force of said spring 10, said elevator lever 11 having a leg member 13 pivotally connected to said elevator plate 9 and extending downwardly, by which means (not shown) for holding said lever against pivotal movement and a hook 12 to be described later is released when said elevator plate 9 is in its lowered position. In the lowered position, the elevator plate 9 is retained in its position by a latching mechanism. The latching mechanism is composed of a roller 14 mounted on the elevator plate 9 and a hook 12 pivotably mounted on the inner casing 1 and urged toward said roller 14. The elevator mechanism 7 is latched in its lowered position by the engagement between the roller 14 and the hook 12. The hook 12 has a guide surface 15 adapted to be engaged by the roller 14 when said roller is lowered, thereby to move said hook in a clockwise direction against the biasing force, and a notch 16 provided below said guide surface 15 and adapted to hook the roller 14. The hook 12 also has a surface 17 adapted to be engaged by the leg member 13 of the elevator lever 11 pivotally connected to the elevator plate 9. When the elevator lever 11 is manually pivoted upwardly when the elevator plate 9 is latched in its lowered position, the leg member 13 pushes the surface 17 of the hook 12 releasing the hooking engagement between the notch 16 and the roller 14, and the elevator plate 9 moves upward under the biasing force of the spring 10. Besides the above-described manual operation, the engagement between the roller and the hook is automatically released by a releasing mechanism 18 which is actuated by the bimetal means at the end of the toasting process. This releasing mechanism 18 is briefly constructed as follows: Namely, the releasing mechanism 18 comprises a base 19 connected to the inner casing 1, a first adjustment plate 21 pivotably connected to said base 19, a second adjustment plate 23 pivotably connected to said first adjustment plate 21 at 22, a weight receiving lever 26 pivotably connected to said second adjustment plate 23 at 24 to be operated by a transmission rod 25 which is connected to the bimetal means to be operated thereby, a guide rod 27 extending upright from said weight receiving lever 26 and a weight 28 slidably mounted around said guide rod 27, all of which are supported on the inner casing 1, and further comprises a shock lever 29 pivotably connected to the elevator plate 9 at 30, a spring 31 provided between the base 19 and the first adjustment plate 21, a spring 32 and an initial adjustment screw 33 provided between the first adjustment plate 21 and the second adjustment plate 23, a spring 34 provided between the second adjustment plate 23 and the weight receiving lever 26 biasing said weight receiving lever 26 toward the transmission rod 25 and a cam 36 provided on the base 19 and operated externally by a knob 35 to adjust the pivotal movement of the weight receiving lever 26 toward the transmission rod 25. The extent of toasting is adjusted by varying the distance between the transmission rod 25 and the weight receiving lever 26.

When the elevator lever 11 is in its lowered position, the weight 28 mounted around the guide rod 27 is supported by a weight supporting portion 37 of the weight receiving lever 26. As the toasting proceeds, the bimetal means is deformed and the transmission rod 25 is shifted incident to the deformation of said bimetal means. The shifting transmission rod 25 pushes the weight receiving lever 26 against the biasing force of the spring 34 and the weight supporting portion 37 of said weight receiving lever 26 is cleared from the weight 28. Consequently, the weight 28 drops onto the shock lever 29 causing said shock lever to make a pivotal movement and hence the roller 14 mounted on said shock lever 29 is caused to make a pivotal movement. Thus, the roller 14 is released from engagement with the hook 12, permitting the elevator plate 9 to move upwardly. Although the construction and operation of the elevator mechanism 7 and the releasing mechanism 18 have been described only briefly hereinbefore, they are described in detail in the specification of U.S. Pat. No. 3,638,556 to the present applicant, dated Feb. 1, 1972.

Figure 6:
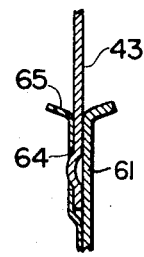
FIG. 6 is a sectional view illustrating the manner of mounting the closure cover of the toaster shown in FIG. 2.

The inner casing 1, the elevator mechanism 7, the latching mechanism and the releasing mechanism 18 are enclosed by an outer casing 38. The outer casing 38 is composed of a substantially U-shaped central frame 39 made from a sheet metal and end frames 40 made of a resin material and connected to the opposite ends of said central frame 39. The central frame 39 is provided with bread inlet openings 41 each communicating with the toasting chamber 5, a slit 44 formed at one side thereof for receiving an engaging lug 43 of a closure cover 42 to be described later, and a rib 45 and a guide slit 46 formed at the other side thereof for guiding said closure cover 42. The closure cover 42 which is slidably mounted on the upper surface of the central frame 39 for opening and closing the bread inlet openings 41 has a bread insertion opening 47 at a location corresponding to the location of the bread inlet opening 41 of the central frame, in the position of said closure cover shown in FIG. 1, and is adapted to close the bread inlet openings 41 of the central frame when the bread carrier frame 6 is in its lowered position. Further, the closure cover 42 has the aforesaid engaging lug 43 formed at a location corresponding to the slit 44 formed in the central frame 39 of the outer casing 38, and a sliding surface 49 and a guide lug 50 formed at locations corresponding to the guide rib 45 and the guide slit 46 of said central frame, said engaging lug 43 being formed with projections 48. Shifting of the closure cover 42 is effected by a closure cover operating mechanism 51 which is composed of an arm 52 rotatably supported by the inner casing 1 and means for operating said arm 52, i.e. a first engaging element and a second engaging element to be described later which are provided on the elevator plate 9. The arm 52 has a horizontal lower end portion rotatably supported by the inner casing 1 as at 53, a first arm portion 54 extending upright parallel to the side plate 3, a first bend 55, a second arm portion 56, a second bend 57 and a third armpportion 58, and is pivotable about said horizontal lower end portion. A first engaging element 59 consisting of a leaf spring is provided on the elevator plate 9 in such a position that it will abuts against the first bend 55 when the elevator plate 9 being lowered is near its lowered position, thereby to cause the arm 52 to pivot to the left. A second engaging element 60 made of a fluorine-contained resin is provided on the elevator plate 9 in such a position that it will abut against the second bend 57 of the arm 52 when said elevator plate 9 starts moving upwardly. The arm 52 is connected to the closure cover 42 at its upper end through a slide plate 61. The slide plate 61 is slidably mounted on a horizontally extending guide rod 62 supported by the inner casing 1. As shown in FIG. 6, a leaf spring 65 having formed therein holes 64 for receiving the projections 48 on the engaging lug 43 of the closure cover 42 is connected to the rear surface being invisible in FIG. 2 of the slide plate 61 in a manner to form a gap therebetween, so that the engaging lug 43 of the closure cover 42 may be inserted into said gap and elastically secured therein with said projections 48 being received in said holes 64. Further, the slide plate 61 is provided with an L-shaped member 61' projecting horizontally from said slide plate and having a notch 61" formed therein for receiving the arm 52, and also provided with another hook-shaped member 61''' projecting horizontally outwardly from said slide plate. The upper end of the arm 52 and the hook-shaped member 61''' are interconnected by a spring 66.

Figure 2:
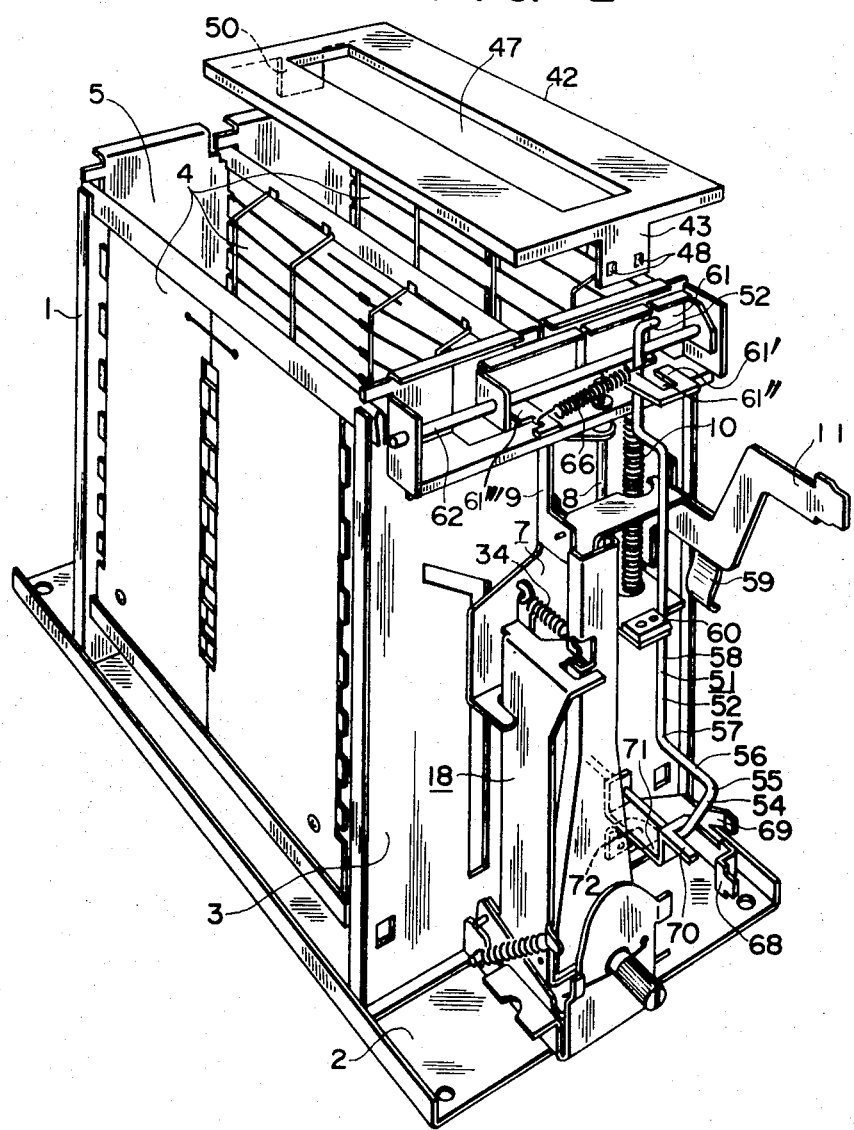
FIG. 2 is a perspective view showing the internal mechanisms of the toaster of FIG. 1 with the outer casing removed.
Figure 4:
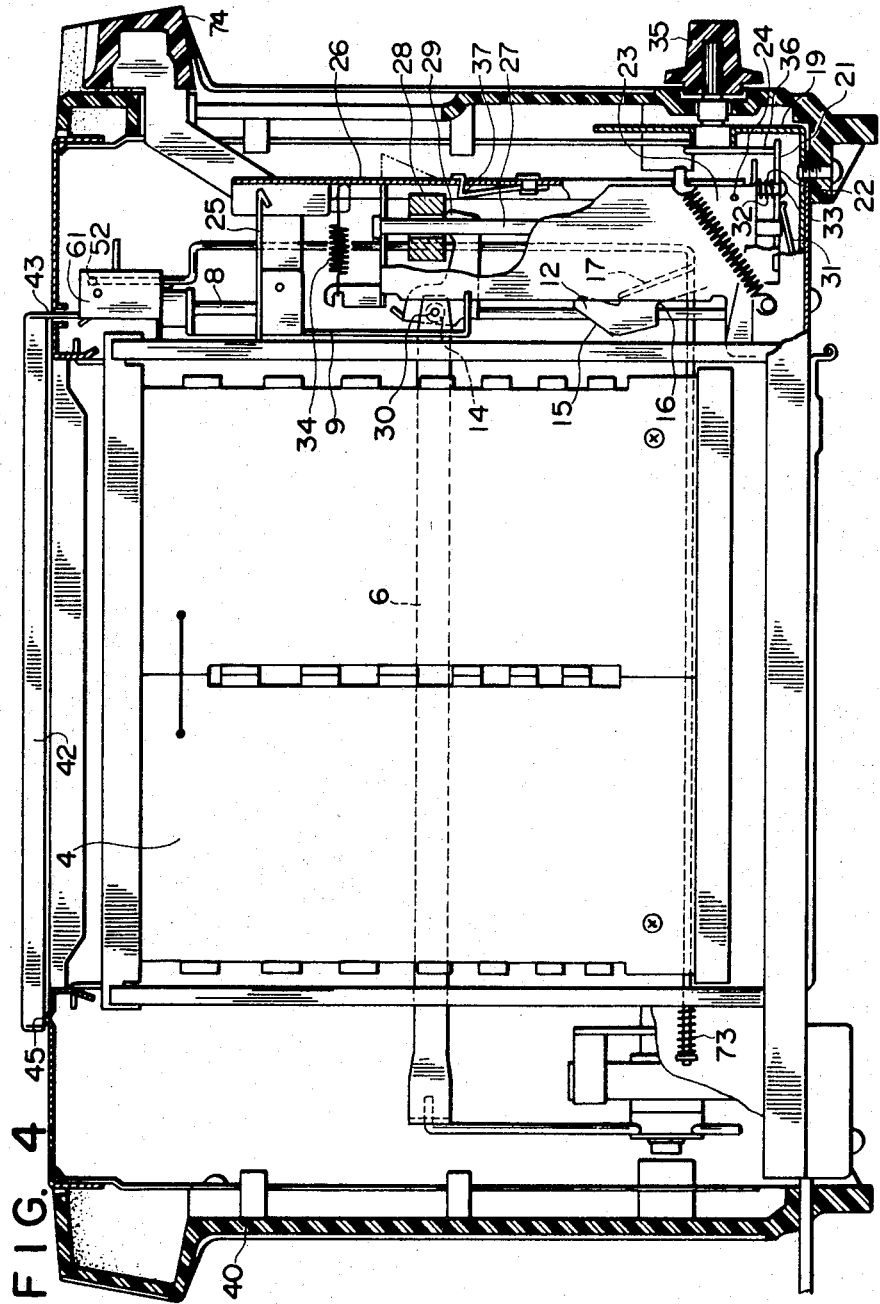
FIG. 4 is a front elevational view of the toaster of FIG. 2, with portions thereof cut away.
Figure 5:
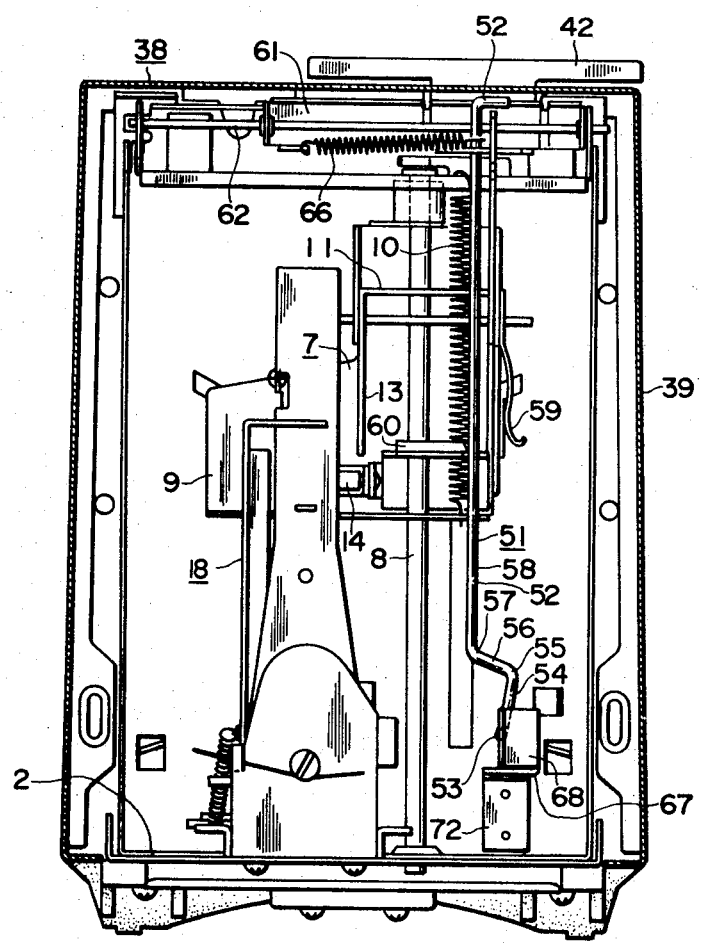
FIG. 5 is a side elevational view of the toaster shown in FIG. 2.

The closure cover 42 is shiftable between the bread inlet opening closing position and opening position not only automatically incident to the vertical movement of the elevator mechanism 7 described above but also manually operating mechanism 67. This manually operating mechanism 67 includes an operating lever 68 provided coaxially with the arm 52 and having an inclined surface 69. The operating lever 68 is so designed that, when it is rotated to the left (in a counterclockwise direction as viewed in FIG. 2), the inclined surface 69 thereof abuts against the first arm portion 54 of the arm 52 causing said arm 52 to move away from the inner casing 1, while when it is rotated in the opposite direction, a lug 70 of the operating lever on the opposite side to said inclined surface 69 abuts against the first arm portion 54 of the arm 52 causing said arm to pivot to the right. The operating lever 68 is normally held in a horizontal position by a leaf spring 72 bearing against the flat undersurface 71 of said lever, as shown in FIGS. 2 and 5. Further, the arm 52 is constantly biased inwardly of the inner casing 1 by a spring 73, as shown in FIG. 4.

When a slice of bread is placed on the carrier frame 6 and the elevator lever 11 is depressed to its lowered position by depressing a handle 74 mounted on the end extremity of said lever, the first engaging element 59 abuts against the first bend 55 of the arm 52 causing said arm to pivot to the left. as viewed in FIG. 2. Accordingly, the slide plate 61 is shifted to the left and the closure cover 42 is shifted to close the bread inlet opening of the outer casing, and concurrently the toasting process begins As the toasting proceeds, the bimetal means is deformed and at the end of the toasting process, the transmission rod 25 connected to one end of said bimetal means abuts against the weight receiving lever 26 and pushes said lever 26 outwardly, so that the weight 28 drops down. When the weight 28 drops onto the shock lever 29, the shock lever 29 releases engagement between the hook 12 and the roller 14 and the elevator plate 9 moves upwardly. As the elevator plate 9 starts moving upward, the second engaging element 60 abuts against the second bend 57 of the arm 52 causing said arm to pivot to the right and thus the closure cover 42 is shifted in the opposite direction to open the bread inlet opening. When it is desired to shift the closure cover to the closing position manually, the knob 75 mounted on the end extremity of the operating lever 68 is turned to the left as viewed in FIG. 1, whereupon the inclined surface 69 of said operating lever 68 abuts against the first arm portion 54 of the arm 52 causing said arm to move away from the inner casing 1, and the knob 75 is turned further to the left after the third arm portion 58 of the arm 52 has been moved away beyond the second engaging element 60, whereby the arm 52 is pivoted to the left and the closure cover 42 is shifted to the closing position. On the other hand, when it is desired to shift the closure cover 42 to its opening position, the knob 75 is turned in the opposite direction, whereby the lug 70 of the operating lever 68 abuts against the third arm portion 58 of the arm 52 causing said arm to pivot to the right and thus the closure cover 42 is shifted to its opening position.

Although the closure cover and the operating mechanism thereof according to the present invention have been described herein as applied to the specific bread carrier frame elevating mechanism illustrated in the drawings, it is to be understood that they can similarly be applied to other known types of elevating mechanism which are so designed that the bread carrier frame is lowered to its lowered position when a slice of bread is placed thereon, and is elevated when the toasting process had ended and toasting detecting means is actuated.

Figure 7:
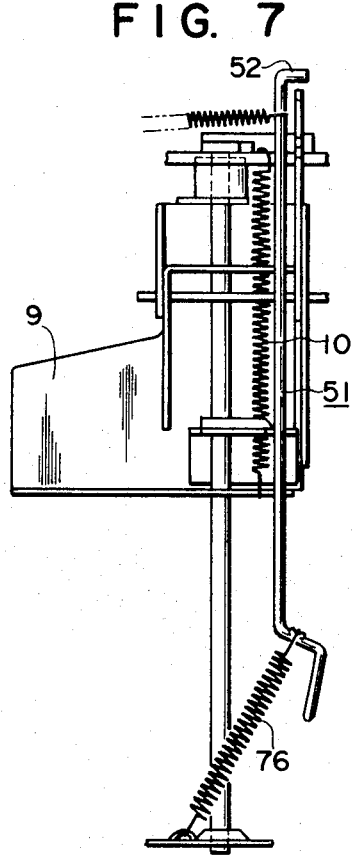
FIG. 7 is a fragmentary side elevational view of another embodiment of the invention, in which the arm is biased by a spring.
Figure 8:
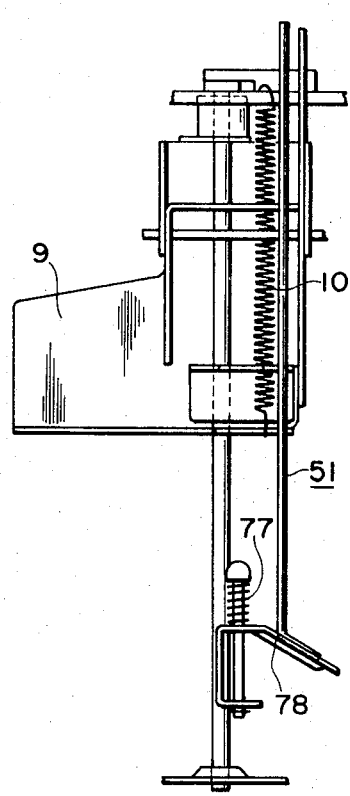
FIG. 8 is a fragmentary side elevational view of still another embodiment of the invention, in which the arm is operated by the bread carrier frame elevator mechanism.

FIG. 7 shows another type of interconnection between the elevator mechanism and the closure cover operating mechanism. According to this type, a spring 76 is provided for constantly urging the arm 52 to pivot to the left, instead of urging the arm 52 to the left by the first engaging element 59 abutting against the first bend 55 of the arm 52. FIG. 8 shows still another type of the interconnection, in which the second arm portion 56 of the arm 52 is extended for engagement with a push lever 78 which is provided with a spring 77, so that when the elevator plate 9 is lowered to its lowered position, the underside of said elevator plate 9 depresses the push lever 78 through said spring 77, whereby the closure cover 42 is shifted to its closing position.

What is claimed is:

1. A toaster with a closure cover, comprising an inner casing defining a bread toasting chamber, a bread carrier frame provided in said toasting chamber and being vertically movable therein, an elevator mechanism for vertically moving said carrier frame, an outer casing provided with bread inlet openings in communication with said toasting chamber, a closure cover slidably mounted on said outer casing and adapted to close said bread inlet openings, and a closure cover operating mechanism including an arm having a horizontal lower end portion, pivotably supported by said inner casing and an upright portion extending upwardly from said horizontal lower end portion and operatively connected at its upper end to said closure cover, said elevator mechanism being provided with two engaging elements for engagement with said arm to actuate said operating mechanism in such a manner as to shift said closure cover to a position to close the bread inlet opening when the bread carrier frame is lowered and to a position to open said bread inlet opening when said bread carrier frame is elevated.

2. A toaster with a closure cover, as defined in claim 1, wherein said closure cover and the upper end of the arm of said closure cover operating mechanism are interconnected through a slide plate slidably provided at the upper portion of the inner casing.

3. A toaster with a closure cover, as defined in claim 2, wherein said closure cover is removably engaged with said slide plate.

4. A toaster with a closure cover, as defined in claim 2, wherein the upper end of said arm is connected to said slide plate through a spring which is extended between said upper end and said slide plate to constantly urge said upper end of the arm into contact with a lug projecting from said slide plate.

5. A toaster with a closure cover, as defined in claim 1, wherein the lower portion of the upright portion of said arm of said closure cover operating mechanism is so shaped as to be engaged by said engaging elements, whereby when the bread carrier frame is lowered, one of said engaging elements engages said lower portion shifting said arm in one direction and thereby shifting said closure cover into a position to close the bread inlet opening, while when said bread carrier frame is elevated, the other of said engaging elements engages said lower portion shifting said arm in the opposite direction and thereby shifting said closure cover into a position to open the bread inlet opening.

6. A toaster with a closure cover, as defined in claim 1, wherein the upright portion of the arm of said closure cover operating mechanism is formed with first and second bends at the lower portion thereof, while said elevator mechanism is provided with first and second engaging elements, the arrangement being such that when the bread carrier frame is lowered, said first engaging element abuts against said first bend of the arm causing said arm to shift in one direction and thereby shifting said closure cover into a position to close the bread inlet opening, while when said bread carrier frame starts to be elevated, said second engaging element abuts against said second bend of the arm causing said arm to shift in the opposite direction and thereby shifting the closure cover into a position to open the bread inlet opening.

7. A toaster with a closure cover, as defined in claim 6, wherein said first engaging element of the elevator mechanism consists of a leaf spring.

8. A toaster with a closure cover, as defined in claim 1, wherein a manually operating mechanism is provided so that said closure cover may be manually shifted from a position to close the bread inlet opening to a position to open the same or vice versa, independently of the elevator mechanism.

9. A toaster with a closure cover, comprising an inner casing defining a bread toasting chamber, a bread carrier frame provided in said toasting chamber and being vertically movable therein, an elevator mechanism for vertically moving said carrier frame, an outer casing provided with bread inlet openings in communication with said toasting chamber, a closure cover slidably mounted on said outer casing and adapted to close said bread inlet opening, a closure cover operating mechanism including an arm having a horizontal lower end portion pivotably supported by said inner casing and an upright portion extending upwardly from said horizontal lower end portion and operatively connected at its upper end to said closure cover, the lower portion of said upright portion being formed with a portion to be engaged, and a manually operating mechanism provided between said closure cover operating mechanism and said inner casing for causing the upright portion of said arm to pivot about the horizontal lower end portion of the same, said elevator mechanism being provided with an engaging element in engagement with the portion to be engaged of said arm of said closure cover operating mechanism, the engagement between said arm and said engaging element being released when said manually operating mechanism is actuated, whereby the closure cover is shifted from a position to close the bread inlet opening to a position to open the same or vice versa independently of said elevator mechanism.

* * * * *